April 30, 1963  H. F. RUMBELL  3,087,745
CONNECTING MEANS FOR FLEXIBLE AND RIGID TUBING
Filed March 27, 1959  2 Sheets-Sheet 1

INVENTOR
HENRY F. RUMBELL
BY
ATTORNEYS

April 30, 1963   H. F. RUMBELL   3,087,745
CONNECTING MEANS FOR FLEXIBLE AND RIGID TUBING
Filed March 27, 1959   2 Sheets-Sheet 2

INVENTOR
HENRY F. RUMBELL
BY
ATTORNEYS

United States Patent Office 3,087,745
Patented Apr. 30, 1963

3,087,745
CONNECTING MEANS FOR FLEXIBLE AND RIGID TUBING
Henry F. Rumbell, Guilford, Conn., assignor to Flexible Tubing Corporation, Guilford, Conn., a corporation of Connecticut
Filed Mar. 27, 1959, Ser. No. 802,356
4 Claims. (Cl. 285—149)

This invention relates to connecting means for joining together lengths of flexible and rigid tubing and, more particularly, to connecting means which include a cuff on the end of the length of a flexible tubing which tapers to a maximum thickness at its free outer end and which is gripped by opposed inner and outer clamping members attached to the end of the length of rigid tubing.

Conduits which carry pressurized fluids in aircraft and various other structures include lengths of flexible tubing at junctions of lengths of rigid tubing in order to permit limited relative displacement between the rigid lengths, to accommodate misalignment of the lengths of rigid tubing, or to direct the conduit through particularly tortuous paths where rigid fittings could not be installed. The lengths of flexible tubing used for these and similar purposes advantageously are of corrugated construction having a wall of rubberized fabric or other flexible material. To connect lengths of flexible tubing of this type to the lengths of rigid tubing, a cuff is formed on or attached to the end of the length of flexible tubing, and this cuff is clipped over the end of the length of rigid tubing and secured in place by a ring clamp. At elevated operating pressures the flexible tubing tends to expand in diameter and correspondingly shorten in length, with the result that plain cylindrical cuffs often pull out longitudinally from under the ring clamp to break the connection with the rigid tubing. To overcome this disadvantage, cuffs which taper in thickness toward their free outer end are used, so that the cuff tends to wedge even more tightly under the ring clamp as a force tending to pull it out from under the ring clamp is applied.

However, even when such tapered cuffs are used failures still occur in pressurized conduits at the connections between lengths of flexible and rigid tubing. One of the sources of trouble is that the edge of the ring clamp tends to cut into the tapered surface of the cuff as the latter wedges under the clamp. At the same time, the opposite edge of the ring clamp often cuts into the narrow end of the cuff where the cuff fairs into the corrugations of the flexible tubing. When the cuff does fail, both the cuff and the ring clamp can be pulled off together from the end of the rigid tubing.

Another difficulty encountered in aircraft is that when these conventional assemblies are subjected to elevated temperatures, the outer ring clamp (which is thermally insulated by the cuff material from the rigid tubing) expands at a substatntially lesser rate than the end of the rigid tubing. The result is that the ring clamp becomes permanently deformed under the high hoop stress to which it is subjected and, upon subsequent cooling of the assembly, it fits so loosely about the cuff that leaks easily develop at the connection.

It is the purpose of the present invention to overcome these and other shortcomings in the design of conventional connecting means between lengths of flexible and rigid tubing. Generally stated, the new connecting means provides a tapered cuff at the end of the length of flexible tubing, which is of maximum thickness at its free outer end and which is gripped by opposed inner and outer clamping members attached to the end of the length of rigid tubing. The rearward edge of the outer clamping member does not engage and hence cannot damage the tapered surface on the cuff. Moreover, the forward edges of both the inner and outer clamping members are defined by novel peripheries which are designed not only to prevent cutting of the cuff but also channel the narrow base of the cuff at the proper angle into the adjacent corrugation of the flexible tubing. A novel structure for the tapered portion of the cuff of the flexible tubing is also provided by the invention to meet the requirements of the particular inner and outer clamping members employed. The outer clamping member of the new connecting means is permanently, even integrally, attached to the length of rigid tubing, so that during use it cannot be pulled from the rigid tubing either alone or along with the cuff. The opposed inner and outer clamping members effect a tight seal against the cuff without being crimped or compressed to squeeze the cuff tightly between them, and consequently there is little opportunity for deformation of either clamping member as a result of unequal thermal expansion.

The new connecting means comprise a cuff of flexible material secured to the end portion of the length of flexible tubing, the cuff being relatively thick at its free outer end and tapering in thickness over an appreciable distance to a minimum where it is joined to the length of flexible tubing. Clamping means are attached to the end portion of the length of rigid tubing for engagement with this tapered cuff. Such clamping means comprise cojoined opposed inner and outer tubular clamping members of rigid material. The inner clamping member fits closely within and conforms to the inside surface of the cuff, and the outer clamping member extends outwardly from the inner clamping member around the thick outer end of the cuff and thence inwardly closely against the outside surface of the cuff to the thin end thereof.

The invention also provides that the above-mentioned cuff be formed with a flexible sharply acute triangular strip having two sides very much longer than its third side. This strip is wrapped in a plurality of superposed turns about the inner layer of the flexible tubing at an appreciable distance from the end thereof. Also, the strip is wrapped with its long side nearest the end of the inner layer laid substantially upon itself at each turn and with its other long side laid progressively nearer the end of the inner layer at each turn. In this manner, the wrapped strip forms a layer tapering in thickness over an appreciable distance to a maximum at the edge thereof nearest the end of the inner layer. The end portion of the inner layer is brought outwardly around the thick end of the tapered layer and thence back along the outer surface thereof. The corresponding end portion of the outer layer of the flexible tubing is laid over the backwardly extending end portion of the inner layer and thence inwardly over the thick end of the tapered layer.

A preferred embodiment of the invention is described in detail below with reference to the accompanying drawings, wherein FIG. 1 is an elevation partly in section of a length of corrugated flexible tubing connected at each end to respective rigid end fittings in accordance with the invention;

Figure 1:
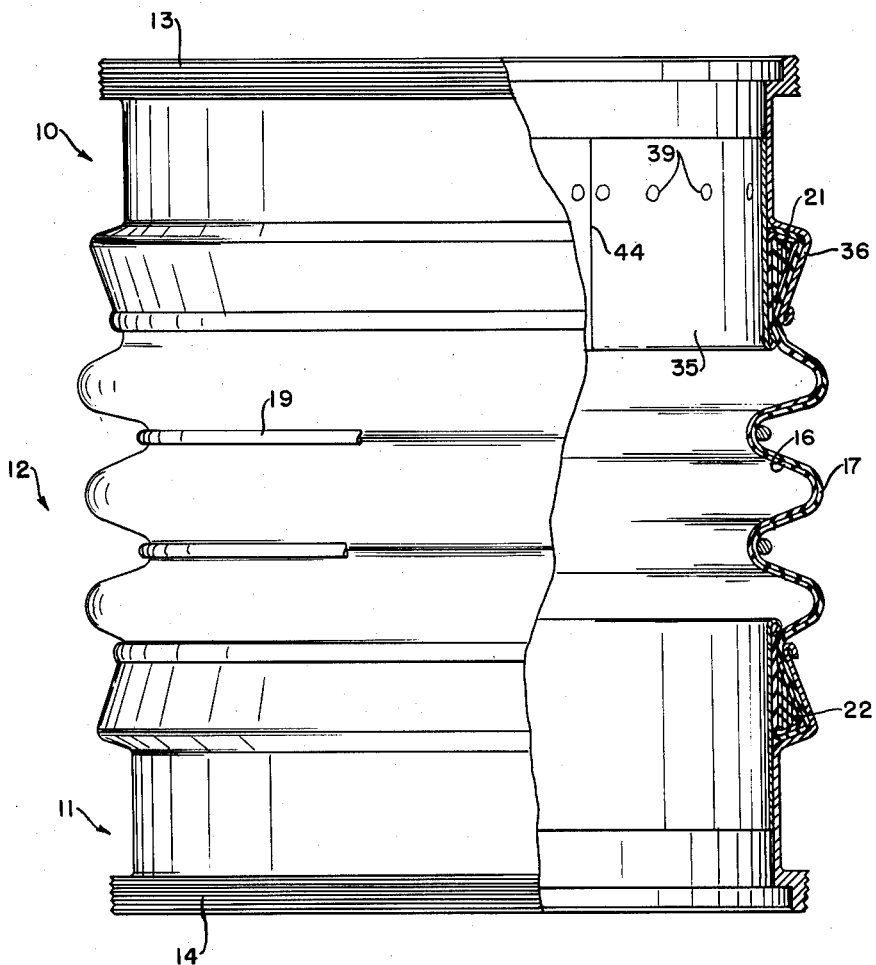

Referring first to FIG. 1, a pair of rigid metal end fittings 10 and 11 of circular cross-section are joined together according to the invention by a length of corrugated flexible tubing 12. For purposes of illustration, the end fittings 10 and 11 include externally threaded shoulders 13 and 14 respectively which permit the assembly to be attached to a rigid conduit adapted to carry pressurized fluids. It is to be understood, however, that the threaded construction of the free ends of the end fittings 10 and 11, and the length of the flexible tubing 12, are illustrative only since the invention resides in the connecting means joining the ends of the flexible tubing 12 to the fittings.

Figure 2:
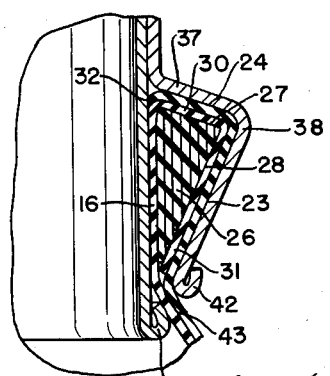
FIG. 2 is a section showing on an enlarged scale the attachment of the cuff of flexible tubing of FIG. 1 to the rigid end fittings.

The wall of the length of the flexible tubing 12 is formed of separable inner and outer layers 16 and 17 respectively of rubberized fabric or similar flexible material, as best shown in FIG. 2. The corrugations in the wall of the flexible tubing 12 provide a great degree of flexibility and extensibility. It is to be noted that in the valley of each corrugation in the flexible tubing 12, a circular supporting hoop 19 is disposed which strengthens the flexible tubing and limits circumferential stretching of the wall under operating conditions. A similar hoop (not shown) could, if desired, be disposed inside each outwardly projecting corrugation to reinforce the flexible tubing against collapse.

Figure 3:
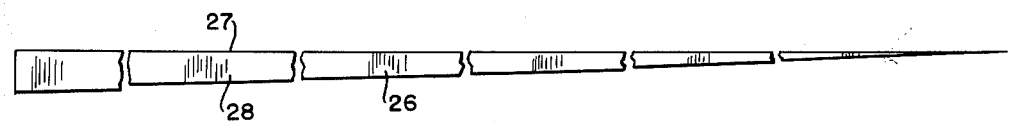
FIG. 3 is a plan view partly broken away of the sharply acute triangular strip used in forming the tapered portions of the cuffs.

According to the invention, cuffs 21 and 22 are formed on the opposite end portions of the length of flexible tubing 12. Since the connecting means is the same at each end of the flexible tubing 12, only the joint between the fitting 10 and the flexible tubing 12 is shown in detail in FIGS. 1 and 2. Each cuff has a thick wall section which tapers in thickness at 23 over an appreciable distance from a minimum where it joins the wall of the flexible tubing to a maximum at its outer end 24. This tapered section is formed by wrapping a sharply acute triangular strip 26 of flexible material (shown in FIG. 3) circumferentially about the inner layer 16 of the material forming the wall of the flexible tubing 12, at an appreciable distance from the end of such layer. The strip is wrapped so that its long side 27 which lies nearest the end of the inner layer 16 is laid substantially upon itself at each turn. At the same time, its other long side 28 is laid progressively nearer the end of the inner layer 16 with each turn, so that the wrapped strip forms a layer tapering in thickness over an appreciable distance from a minimum where it is adjacent the normal thickness of the wall of the flexible tubing to a maximum where it lies nearest the end of the inner layer 16.

After the strip 26 is wrapped in this manner, the end portion of the inner layer 16 is brought outwardly around the thick end of the wrapped strip at 30 and back along the outer surface of the tapered layer as indicated at 31. Then the end portion of the outer layer 17 of the flexible tubing is brought up over the end portion of the inner layer, to define the outer surface 23 of the tapered cuff. The end portion of this outer layer 17 is laid inwardly over the portion 30 of the inner layer 16 to define the thick end 24 of the cuff. Both end portions are cemented or otherwise securely attached to each other and to the underlying wrapping of the triangular strip 26. With the inner and outer layer 16 and 17 of the flexible tubing overlapping on the wrapped strip 26 in this manner, the only seamline on the finished cuff is at 32 where the end of the outer layer 17 is exposed. As a result, the tapered surface 23 of the cuff is smooth and unbroken.

The cuff thus formed is attached to the length of rigid fitting 10 by clamping means on the end portion of the latter. These clamping means include substantially cylindrical metallic inner and outer clamping members 35 and 36 respectively. The outer clamping member 36 is an integral part of the rigid end fitting 10 and defines the end portion thereof. It includes a portion 37 which extends substantially radially outwardly along the thick end 24 of the cuff 21, and a portion 38 which returns downwardly and inwardly closely against the outside surface 23 of the tapered cuff to the narrow end thereof where it joins with the corrugated tubing.

The inner clamping member 35 is spot-welded at 39 an appreciable distance from its free outer edge to the inside surface of the wall of the rigid fitting 10. This inner clamping member 35 fits concentrically within the cuff 21 in contact with the inside surface of inner layer 16 of the flexible tubing 12. As shown most clearly in FIG. 2, the free edge of the inner member 35 extends to a position substantially opposite the free edge of the outer clamping member 36. These opposed free edges are formed with integral rounded peripheral beads 41 and 42. These beads, and the aperture between the inner and outer clamping members 35 and 36 at their ends, are arranged so as to direct the narrow end of the cuff 21 at its junction 43 with the wall of the corrugated tubing outwardly in conformity with the lay of the immediately adjoining corrugated portion of the flexible tubing 12.

In assembling the connecting means of the invention, the cuff 21 is first formed in the manner described and is fitted under the outer clamping member 36 in the position shown in FIGS. 1 and 2. Next, the inner clamping member 35 is inserted through the open end of the rigid fitting 10 to the position where its beaded edge 41 is in the desired position opposite the beaded edge 42 on the outer clamping member 36. In order to facilitate this insertion of the inner clamping member 35, it is preferable that the inner clamping member be split longitudinally along some one line 44 so that it can be collapsed enough to permit its beaded end to be passed through the rigid fitting 10. The assembly is then completed by spot-welding the inner and outer clamping members 35 and 36 together at 39.

In this novel connection between the lengths of flexible and rigid tubing, there is no edge on either clamping member which can in any way cut into or damage the tapered cuff 21. The outer clamping member 36 provides a broad bearing surface which extends completely over the outer surface of the cuff 21. The beaded edges 41 and 42 and the aperture between them direct the cuff at the proper angle into the adjacent corrugation in the flexible tubing 12, and so minimize concentration of bending stresses at the junction of the tubing wall with the narrow end of the cuff. The exposed surfaces of the cuff 21 are substantially unbroken and its only outside seam at 32 is located where it cannot be forced open by either the inner or the outer clamping member. Since the outer clamping member 36 is an integral part of the rigid fitting 10 and the inner clamping member 35 is securely welded to it, the flexible tubing 12 cannot be pulled from the rigid fitting 10 either alone or along with one of the clamping members except by actually tearing off the cuff.

An effective fluid-tight seal is provided in this assembly without radially crimping or otherwise squeezing together the inner and outer clamping members 35 and 36 against the interposed cuff 21. This results from the fact that fluid pressure within the conduit forces the cuff 21 against the outer clamping member 36 sufficiently tightly to effect the seal. There is little opportunity for deformation of either the inner or outer clamping members due to unequal thermal expansion, for since they are in metal-to-metal contact they cannot ordinarily come to very different temperatures; and in any event, being permanently joined together they expand and contract together without exerting undue hoop stress upon each other.

Figure 4:
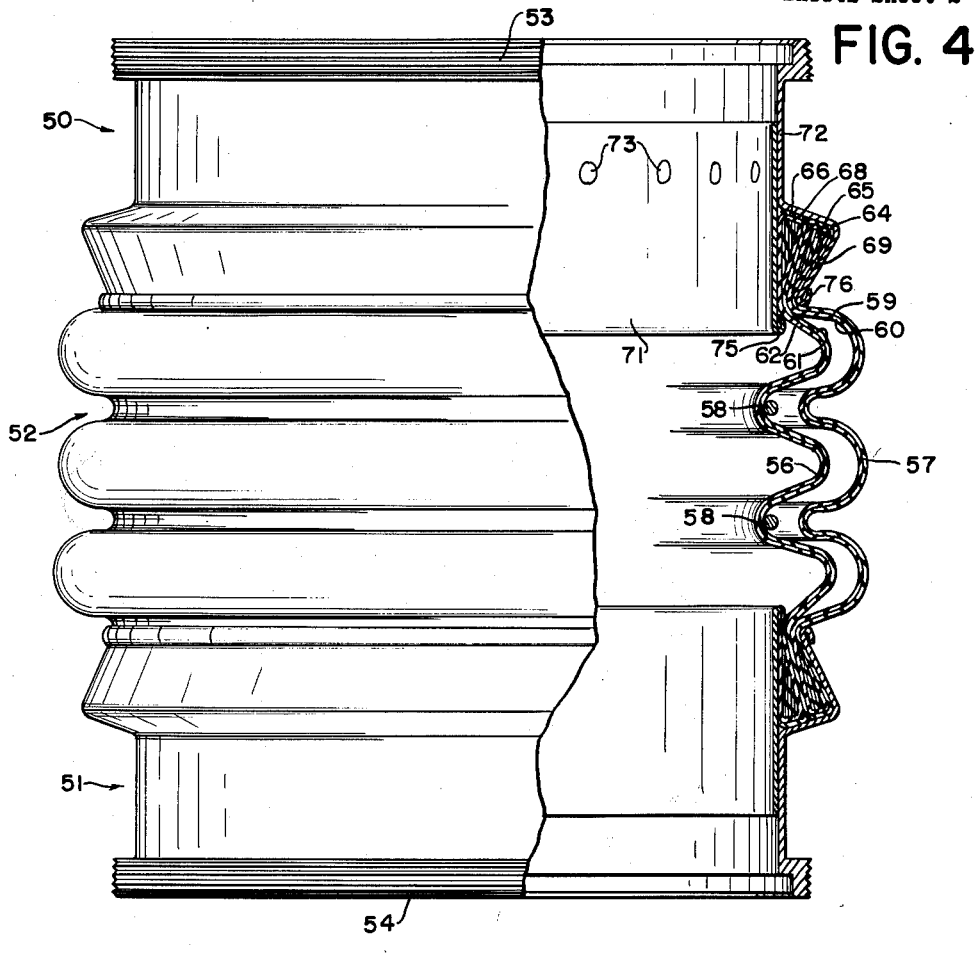
FIG. 4 is an elevation partly in section of a length of double-walled corrugated flexible tubing connected at each end to rigid end fittings according to the invention.

In the embodiment of the invention shown in FIG. 4, a pair of rigid end fittings 50 and 51 are interconnected by a length of corrugated flexible tubing 52. Again, for purposes of illustration only, the rigid end fittings 50 and 51 include externally threaded shoulders 53 and 54 respectively to permit them to be connected to a rigid conduit adapted to carry pressurized fluid. In this embodiment, however, the corrugated wall of the length of flexible tubing 52 is of double thickness so that if the internal wall 56 ruptures during operation, the external wall 57 will still prevent leakage and maintain the integrity of the pressure system until a repair can be made. In some cases, pressure sensing means are included in such an assembly as this to indicate when the pressure between the internal and external walls 56 and 57 exceeds a given level, thereby indicating leaks in the internal wall 56 before the external wall 57 distends excessively or ruptures.

Hoops 58 encircle the flexible tubing 52 in the valleys in the internal wall 56. These hoops strengthen the flexible tubing and limit circumferential stretching under operating pressure. Each of the corrugated walls 56 and 57 are made of double thickness of rubberized fabric or other flexible material; the external wall 57 being made of inner and outer layers 59 and 60 and the internal wall 56 being made of inner and outer layers 61 and 63.

Only the joint between the fitting 50 and the flexible tubing 52 need be described in detail, since the connecting means is the same at each end of the flexible tubing. A tapered cuff 64 is formed at the end of each wall 56 and 57 of the flexible tubing 52 by wrapping two flexible sharply acute triangular strips 65 and 66 respectively about the inner layers 60 and 62 of these walls, each wrapping being applied at about the same distance from the ends of such layers. Each of the strips 65 and 66 are wrapped in the same manner as described above with reference to FIGS. 1 and 2, with one of its long sides nearest the end of the tubing wall inner layers laid substantially upon itself at each turn and with the other of its long sides laid progressively nearer the end of the tubing wall inner layers at each turn. In this manner the thickness of each wrapping formed by the strips 65 and 66 tapers over an appreciable distance to a maximum at the edge thereof nearest the end of the tubing wall inner layer on which it is wound.

The end portion of each of the inner layers 60 and 62 is brought outwardly around the thick end of the tapered wrapping and then back along the outer surface thereof. The end portion of each of the outer layers 59 and 61 then is laid over the backwardly extending end portion of its respective inner layer and thence substantially outwardly up the outer tapered portion of the respective wrapped strip and inwardly over the thick end of the tapered wrapping. This results is providing each of the walls 56 and 57 with a tapered cuff similar to that described with reference to FIGS. 1 and 2.

When a tapered cuff has thus been formed at the ends of both the internal and external walls 56 and 57, they are brought together as shown in FIG. 4 in side-by-side relation with their thick ends together as indicated at 68 and with their thinner ends juxtaposed where they join the corrugated walls of the flexible tubing 52.

Clamping means essentially the same as described above with reference to FIGS. 1 and 2 is formed at the end of the length of rigid tubing 50. These clamping means include a cylindrical inner metallic clamping member 71 and a substantially cylindrical outer metallic clamping member 72. The outer clamping member 72, which is integral with the rigid tubing 50, includes a section which extends substantially radially outwardly over the thick end portion 68 of the combined cuff 64, and a section which lies closely against the outside portion 69 of the combined cuff and terminates adjacent the thin end of the cuff. The inner clamping member 71 is spot-welded at 73 to the inside surface of the rigid tubing 50, and fits concentrically within the inside surface of the cuff 64, with its free end in juxtaposition with the free end of the outer clamping member 72. The opposed free ends of the inner and outer clamping members 71 and 72 are formed into integral rounded peripheral beads 75 and 76 which are arranged to direct the narrow ends of the cuff outwardly to conform with the adjoining corrugated portion of each wall of the flexible tubing 52.

Assembly of the cuff and clamping means is accomplished as described above with reference to FIGS. 1 and 2. As in the embodiment shown in FIGS. 1 and 2, there are no edges on the clamping members 71 and 72 which can cut or otherwise damage the cuffs on the flexible tubing. Their beaded peripheries direct the thin ends of the cuffs through the aperture between them at the proper angle to conform with the adjacent corrugations of the flexible tubing. In other respects too, the connection between the flexible and rigid tubing shown in FIG. 4 possesses the same advantageous features as the connection shown in FIGS. 1 and 2.

I claim:

1. In combination with a length of flexible tubing of separable inner and outer layers of flexible material and a length of rigid tubing, connecting means for joining said lengths together comprising a cuff secured to the end of the length of flexible tubing, said cuff comprising a flexible sharply acute triangular strip having two sides very much longer than its third side wrapped in a plurality of superposed turns about the inner layer of said flexible tubing at an appreciable distance from the end thereof, said strip being wrapped with its long side nearest the end of said inner layer laid substantially upon itself at each turn and with its other long side laid progressively nearer the end of said inner layer at each turn, whereby the wrapped strip forms a layer tapering in thickness over an appreciable distance to a maximum at the edge thereof nearest the end of said inner layer, the end portion of said inner layer being brought outwardly around the thick end of said tapered layer and thence back along the outer surface thereof, and the corresponding end portion of the outer layer of said flexible tubing being laid over the backwardly extending end portion of the inner layer and thence inwardly over the thick end of the tapered layer; and clamping means at the end portion of the length of rigid tubing for substantially compression-free engagement with said tapered cuff comprising annularly cojoined opposed inner and outer tubular clamping members of rigid material, said inner clamping member being of substantially uniform diameter throughout its length and fitting closely within and conforming to the inside surface of said cuff, and said outer clamping member defining a substantially continuous bearing surface extending outwardly from the inner clamping member around the thick outer end of said cuff and thence inwardly closely against the outside surface of said tapered cuff to the thin end thereof.

2. In combination with a length of flexible tubing of separable inner and outer layers of flexible material and a length of rigid tubing, connecting means for joining said lengths together comprising a cuff secured to the end of the length of flexible tubing, said cuff comprising coextensive built-up end portions on said walls, each built-up end portion comprising a flexible sharply acute triangular strip having two sides very much longer than its third side wrapped in a plurality of superposed turns about the inner layer of its respective wall at an appreciable distance from the end thereof, each strip being wrapped with its long side nearest the end of its respective inner layer laid substantially upon itself at each turn and with its other long side laid progressively nearer the end of its respective inner layer at each turn, whereby each wrapped strip forms a layer tapering in thickness over an appreciable distance to a maximum at the edge thereof nearest the end of its respective inner layer, the end portion of each inner layer being brought outwardly around the thick end of its respective tapered layer and thence back along the outer surface thereof, and the corresponding end portion of each outer layer of said flexible tubing being laid over the backwardly extending end portion of its respective inner layer and thence inwardly over the thick end of the tapered layer, the built-up end portions of said walls brought together in side-by-side relationship with their thick ends together to complete the cuff of said flexible tubing; and clamping means at the end portion of the length of rigid tubing for substantially compression-free engagement with said tapered cuff, said clamping means comprising annularly cojoined opposed inner and outer tubular clamping members of rigid material, said inner clamping member being of substantially uniform diameter throughout its length and fitting closely within and conforming to the inside surface of said cuff, and said outer clamping member defining a substantially continuous bearing surface extending outwardly from the inner clamping member around the thick outer end of said cuff and thence inwardly closely against the outside surface of said tapered cuff to the thin end thereof.

3. In combination with a length of substantially cylindrical corrugated flexible tubing of separable inner and outer layers of flexible material and a length of cylindrical metal tubing, connecting means for joining said lengths together comprising a substantially cylindrical cuff which comprises a flexible sharply acute triangular strip having two sides very much longer than its third side wrapped in a plurality of superposed turns about the inner layer of said flexible tubing at an appreciable distance from the end thereof, said strip being wrapped with its long side nearest the end of said inner layer laid substantially upon itself at each turn and with its other long side laid progressively nearer the end of said inner layer at each turn, whereby the wrapped strip forms a layer tapering in thickness over an appreciable distance to a maximum at the edge thereof nearest the end of said inner layer, the end portion of said inner layer being brought outwardly around the thick end of said tapered layer and thence back along the outer surface thereof, and the corresponding end portion of the outer layer of said flexible tubing being laid over the backwardly extending end portion of the inner layer and thence inwardly over the thick end of the tapered layer; and clamping means of rigid material joined to the end portion of the length of metal tubing for substantially compression-free engagement with said tapered cuff, said clamping means comprising an outer metallic clamping member and a substantially cylindrical inner metallic clamping member of substantially uniform diameter throughout its length having substantially coextensive opposed end portions, said inner clamping member fitting closely within and being annularly secured to the inside surface of said outer clamping member at an appreciable distance from their opposed ends, said cylindrical inner clamping member fitting concentrically closely within the inside surface of said cuff and extending to the end of said cuff remote from its thick end, and said outer clamping member defining a substantially continuous bearing surface extending radially outwardly from the inner clamping member around the thick outer end of said cuff and thence inwardly closely against the outside surface of said cuff to the thin end thereof, the opposed outer ends of each of said inner and outer clamping members terminating in integral rounded peripheral beads, said opposed outer ends and said beads being constructed and arranged to fair the end of said cuff remote from said thicker edge outwardly to the adjoining corrugated portion of the flexible tubing.

4. In combination with a length of substantially cylindrical corrugated flexible tubing of separable inner and outer layers of flexible material and a length of cylindrical metal tubing, connecting means for joining said lengths together comprising a substantially cylindrical cuff secured to the end of the length of flexible tubing, said cuff comprising coextensive built-up end portions on said walls, each built-up end portion comprising a flexible sharply acute triangular strip having two sides very much longer than its third side wrapped in a plurality of superposed turns about the inner layer of its respective wall at an appreciable distance from the end thereof, each strip being wrapped with its long side nearest the end of its respective inner layer laid substantially upon itself at each turn and with its other long side laid progressively nearer the end of its respective inner layer at each turn, whereby each wrapped strip forms a layer tapering in thickness over an appreciable distance to a maximum at the edge thereof nearest the end of its respective inner layer, the end portion of each inner layer being brought outwardly around the thick end of its respective tapered layer and thence backward along the outer surface thereof, and the corresponding end portion of each outer layer of said flexible tubing being laid over the backwardly extending end portion of its respective inner layer and thence inwardly over the thick end of the tapered layer, the built-up end portions of said walls being brought together in side-by-side relationship with their thick ends together to complete the cuff of said flexible tubing; and clamping means of rigid material joined to the end portion of the length of metal tubing for substantially compression-free engagement with said tapered cuff, said clamping means comprising an outer metallic clamping member and a substantially cylindrical inner metallic clamping member of substantially uniform diameter having substantially coextensive opposed end portions, said inner clamping member fitting closely within and being annularly secured to the inside surface of said outer clamping member at an appreciable distance from their opposed ends, said cylindrical inner clamping member fitting concentrically closely within the inside surface of said cuff and extending to the end of said cuff remote from its thick end, and said outer clamping member defining a substantially continuous bearing surface extending radially outwardly from the inner clamping member around the thick outer end of said cuff and thence inwardly closely against the outside surface of said cuff to the thin end thereof, the opposed outer ends of each of said inner and outer clamping members terminating in integral rounded peripheral beads, said opposed outer ends and said beads being constructed and arranged to fair the end of said cuff remote from said thicker edge outwardly to the adjoining corrugated portion of the flexible tubing.

References Cited in the file of this patent

UNITED STATES PATENTS

| 1,129,615 | Sykes | Feb. 23, 1915 |
| 1,345,971 | Star | July 6, 1920 |
| 1,922,431 | Geyer | Aug. 15, 1933 |
| 1,939,872 | Bedur | Dec. 19, 1933 |
| 1,962,060 | Emery | June 5, 1934 |
| 2,099,413 | White | Nov. 16, 1937 |
| 2,237,490 | Knowland | Apr. 8, 1941 |
| 2,354,045 | Nystrom | July 18, 1944 |
| 2,428,652 | Cole | Oct. 7, 1947 |
| 2,738,993 | Wilson | Mar. 20, 1956 |
| 2,743,801 | Taust | May 1, 1956 |
| 3,016,161 | Peplin | Jan. 9, 1962 |

FOREIGN PATENTS

| 198,450 | Germany | May 19, 1908 |
| 450,181 | Great Britain | July 13, 1936 |
| 592,915 | Great Britain | Oct. 2, 1947 |